United States Patent
Natori (10) Patent No.: US 8,953,419 B2
(45) Date of Patent: Feb. 10, 2015

(54) MULTITRACK RECORDER

(71) Applicant: TEAC Corporation, Tama-shi, Tokyo (JP)

(72) Inventor: Ikuomi Natori, Tama (JP)

(73) Assignee: TEAC Corporation, Tama-Shi, Tokyo (JP)

( * ) Notice: Subject to any disclaimer, the term of this patent is extended or adjusted under 35 U.S.C. 154(b) by 0 days.

(21) Appl. No.: 13/752,833

(22) Filed: Jan. 29, 2013

(65) Prior Publication Data

US 2014/0056115 A1 Feb. 27, 2014

(30) Foreign Application Priority Data

Aug. 24, 2012 (JP) ................................. 2012-185869

(51) Int. Cl.
*H04B 1/20* (2006.01)
*G11B 20/00* (2006.01)
*G11B 27/034* (2006.01)
*G11B 27/34* (2006.01)

(52) U.S. Cl.
CPC ........ *G11B 20/00992* (2013.01); *G11B 27/034* (2013.01); *G11B 27/34* (2013.01)
USPC ................. 369/4; 369/92; 369/47.32; 700/94

(58) Field of Classification Search
USPC ........ 369/4, 30.01, 59.1, 59.14, 59.25–59.27, 369/47.32, 53.44; 700/94
See application file for complete search history.

(56) References Cited

U.S. PATENT DOCUMENTS

| 6,343,054 B1* | 1/2002 | Maeda ...................... 369/47.32 |
| 7,343,210 B2* | 3/2008 | DeVito et al. ................... 700/94 |
| 2002/0045962 A1 | 4/2002 | Kobayashi |
| 2004/0091126 A1* | 5/2004 | Hirade et al. ................. 381/119 |
| 2013/0073959 A1* | 3/2013 | Eppolito et al. .............. 715/716 |
| 2013/0073960 A1* | 3/2013 | Eppolito et al. .............. 715/716 |

FOREIGN PATENT DOCUMENTS

| JP | 2002124022 A | 4/2002 |
| JP | 4122936 B2 | 7/2008 |

OTHER PUBLICATIONS

Extended European search report for Application No. 13175446.7-1910/2701151 dated May 26, 2014 (6 pgs.).
Anonymous, "R24 Recorder:Interface:Controller:Sampler, Operation Manual," Zoom Corporation, Nov. 2011, XP002711380, retrieved from the Internet: URL:www.zoom.co.jp/download/E_R24.pdf [retrieved Apr. 1, 2014], pp. 1-138 (70 pgs.).

(Continued)

*Primary Examiner* — Wayne Young
*Assistant Examiner* — Dionne Pendleton
(74) *Attorney, Agent, or Firm* — Seed IP Law Group PLLC (57) ABSTRACT

A multitrack recorder capable of setting one track or more to a monaural type or a stereo type has a storage unit that stores a history of track-type changing-and-setting operations and operations entailing erasure or changing of audio data stored on each track and that stores specifics of the track-type changing-and-setting operations and the audio data erased or changed along with performance of operations in association with each operation, and a change unit that changes audio data stored in each track, and a type of the track, to audio data that were stored in each track, and a type of the track, before performance of a specified operation.

7 Claims, 5 Drawing Sheets

(56) References Cited

OTHER PUBLICATIONS

Anonymous, "DP-24 Digital Portastudio, Owner's Manual (D01159020D)," TASCAM, TEAC Corporation, Apr. 20, 2012, XP002711403, retrieved from the Internet: URL:http://tascam.com/content/downloads/products/723/e_dp-24_om_vd.pdf [retrieved Apr. 1, 2014] pp. 1-108 (54 pgs.).

Anonymous, "2488neo Digital Portastudio, Owner's Manual (D01044520A)," TASCAM, TEAC Corporation, Sep. 3, 2008, pp. 1-124, XP002711381, retrieved from the Internet: URL:http://tascam.com/content/downloads/products/4/E_2488neo_web.pdf [retrieved Apr. 1, 2014] (62 pgs.).

* cited by examiner

| TRACK3 | TRACK4 |
|---|---|
| No Change | MN -> ST |
| No Change | ST -> MN |
| MN -> ST | No Change |
| MN -> ST | MN -> ST |
| MN -> ST | ST -> MN |
| ST -> MN | No Change |
| ST -> MN | MN -> ST |
| ST -> MN | ST -> MN |

FIG. 7

| | | |
|---|---|---|
| h4 | TRACK TYPE | CHANGE TRACK 3 FROM ST TO MN, MAKE NO CHANGE TO TRACK 4 |
| h3 | RECORDING | RECORD AUDIO DATA Sst ON TRACK 3 |
| h2 | TRACK TYPE | CHANGE TRACK 3 FROM MN TO ST, MAKE NO CHANGE TO TRACK 4 |
| h1 | RECORDING | RECORD AUDIO DATA Smn ON TRACK 3 |
| h0 | TRACK TYPE | CHANGE TRACK 3 FROM ST TO MN, CHANGE TRACK 4 FROM ST TO MN |
| . | . | . |
| . | . | . |
| . | . | . |

FIG. 8

MULTITRACK RECORDER

PRIORITY INFORMATION

This application claims priority to Japanese Patent Application No. 2012-185869, filed on Aug. 24, 2012, which is incorporated herein by reference in its entirety.

BACKGROUND OF THE INVENTION

1. Technical Field

The invention relates to a multitrack recorder that records a sound signal in a plurality of tracks.

2. Related Art

A hitherto-known multitrack recorder records a sound signal into a plurality of tracks. A multitrack recorder makes it possible to record a rhythm guitar part in a track 1 and a lead guitar part in a track 2 by use of; for instance, an electric guitar and a vocal sound in a track 3 by use of a built—in microphone and mix down them to thereby generate and record a stereo signal.

In such a multitrack recorder, in order to acquire a desired audio signal, editing work for superposing a plurality of audio signals one audio signal on another or splicing the audio signals together is often performed, or the plurality of audio signals are often recorded on one track repeatedly. As a matter of course, audio signals stored on a track are erased or overwritten in the course of such work. Accordingly, an operation cancel (UNDO) function has hitherto been proposed. In the event of operation ending in a failure or recording operation being unsuccessful, the operations are cancelled by the function, thereby recovering the status achieved before performance of the operations.

For instance, 2002-124022-A discloses a technique for storing edited track data as new track data that are independent of raw track data every time audio data stored on a track are edited. U.S. Pat. No. 4,122,936 discloses a technique for establishing an association between a recorded source file (an audio data file stored on a track) and a file name of a source file to be newly recorded, thereby facilitating searching for a target file among a plurality of files being edited. Even if operation ends in a failure or recording operation is unsuccessful, the technique enables easy restoration of desired audio data.

Incidentally, it is desirable that the multitrack recorder be able to record a sound signal in as many tracks as possible. In the meantime, when an attempt is made to make the multitrack recorder compact in consideration of portability, limiting the number of tracks might be unavoidable. Measures that are conceivable in the circumstances are to limit the number of tracks to a certain number; for instance, four and make some of the tracks assignable to either a monaural type or a stereo type rather than fixing the tracks solely to monaural types to enhance user's convenience.

When one track is made switchable between a monaural type and a stereo type, processing of the track, for instance, processing pertaining to playback or recording, is also switched according to the type (the monaural type or the stereo type) of the track. In order to address such a difference in processing, there is desire that consistency should always exist between a type of each track and a type of audio data stored thereon. In order to fulfill such a desire, when audio data are restored by means of the operation cancel (UNDO) function, a type of a track must also be changed according to a type of the audio data. However, an operation cancel function intended for use in a case where one track is switchable between a stereo type and a monaural type has not hitherto been available. Therefore, when the related-art operation cancel function is applied directly to such a case, a problem occurs, such as a loss of consistency between a type of audio data to be stored on each track and a type of the track.

SUMMARY

Accordingly, the invention provides a multitrack recorder capable of always maintaining consistency between a type of a track and a type of audio data to be recorded.

A multitrack recorder of the invention is directed toward a multitrack recorder that records audio data onto a plurality of tracks, comprising: a track type setting unit that sets one track or more of a plurality of tracks to either a monaural type or a stereo type; and an operation cancel unit that stores an operation history and that cancels operations subsequent to specified operation, wherein the operation cancel unit has a storage unit that stores a history of track-type changing-and-setting operation and operation entailing erasure or changing of audio data stored on each track and that stores specifics of the track-type changing-and-setting operation and the audio data erased or changed along with performance of operation in association with each operation; and a change unit that changes audio data stored on each track and a type of the track to audio data that were stored on each track before performance of the specified operation and a type of the track.

In a preferred mode, the track type setting unit erases audio data stored on a corresponding track along with performance of the track-type changing-and-setting operation, and the storage unit stores specifics of the change in track type and audio data erased by track-type changing-and-setting operation in association with the track-type changing-and-setting operation.

According to the invention, during performance of operation cancel (UNDO) processing, a recovery of the track types achieved before performance of specified operation, as well as restoration of audio data stored on each of tracks, are performed. Therefore, consistency between a type of audio data stored on each of the tracks and the type of the track can be maintained.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION

An embodiment of the invention is hereunder described by reference to the drawings.

Figure 1:
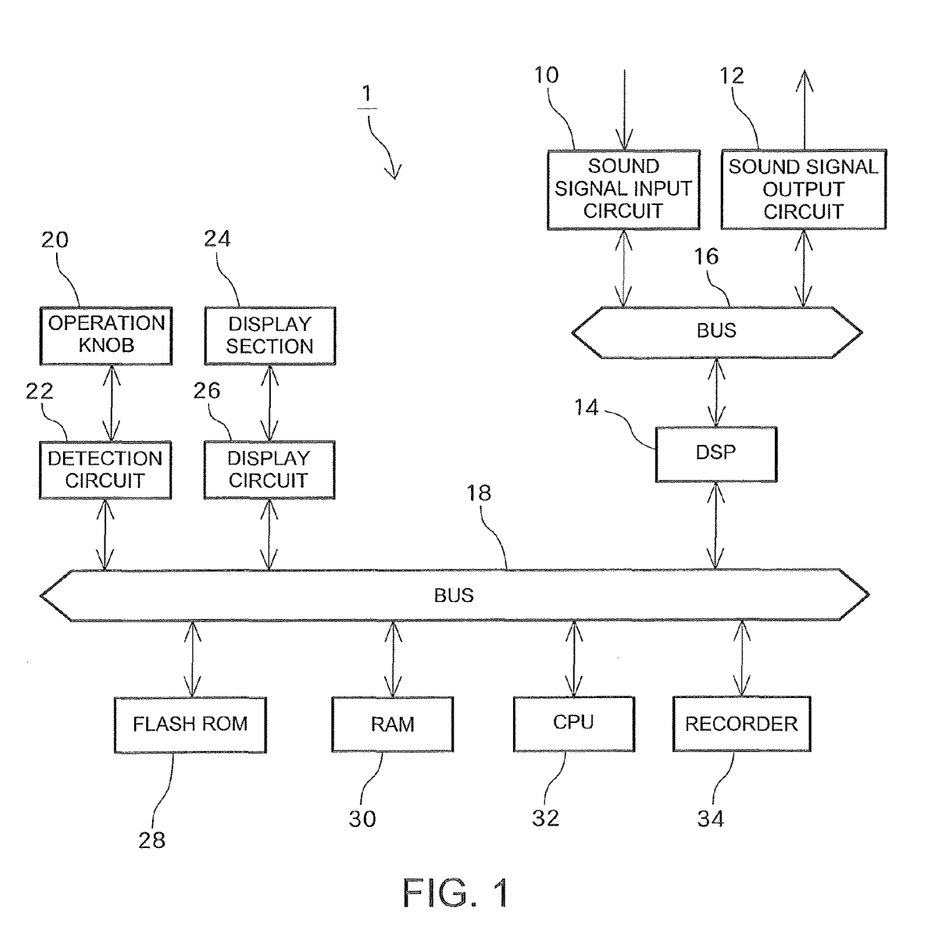
FIG. 1 is a block diagram of a multitrack recorder of an embodiment.

FIG. 1 is a block diagram of a multitrack recorder 1 of the embodiment. A sound signal input circuit 10 has a plurality of input ports and is provided with inputs of sound signals from a plurality of sound generators (sources). Exemplifications of the plurality of sound signals include a guitar sound, a vocal sound, a drum sound, and the like. In the embodiment, the sound signal input circuit 10 has two built-in microphones and two input ports and is provided with inputs of sound signals. The built-in microphones and the input ports are switchable. A sound signal input by way of the sound signal input circuit 10 is fed to a DSP (Digital Signal Processor) 14 by way of a bus 16.

Under control of a CPU 32, the DSP 14 subjects sound signals of a plurality of channels, which are fed from the sound signal input circuit 10, to various digital processing; for instance, effect processing, equalizing, or mixing, and are recorded in the recorder 34 by way of the bus 18. A recording medium of the recorder 34 is an optical disc, including a CD-R/RW and a DVD-R/RW, a hard disc drive, a flash memory medium, and the like. Processing of the DSP 14 also includes processing for controlling PAN and a volume level of each of the sound signals according to manipulation of operation knobs 20.

The operation knobs 20 are disposed on an operation surface of the multitrack recorder 1. The operation knobs 20 are made up of various key switches, a selection button, a menu button, a determination button, a PAN knob, a level knob, and others. The user assigns an individual sound signal to at least one track of a plurality of tracks by manipulating the operation knobs 20. A detection circuit 22 detects a state of manipulation of the operation knobs 20. The detection circuit 22 supplies a manipulation status detection signal pertaining to the operation knobs 20 to the CPU 32 by way of the bus 18.

The CPU 32 collectively controls an entirety of the multitrack recorder. According to a program stored in flash ROM 28, the CPU 32 performs various processing by use of RAM 30 serving as working memory. Specifically, respective sound signals of a plurality of channels are assigned to at least any of the plurality of tracks according to the operation status detection signal from the detection circuit 22. For instance, when there are tracks from a track 1 to a track 4, a channel A is assigned to the track 1; a channel B is assigned to the track 2; and a channel C is assigned to the track 4. In the embodiment, a correlation between channels and tracks resulting from assignment of the respective channels to the respective tracks is referred to as "assignment information." The CPU 32 supplies various information to a display circuit 26. The display circuit 26 displays various information on a display section 24.

The CPU 32 commands the display circuit 26 to display a variety of menu screens and a setting screen in compliance with user's manipulation of the operation knobs 20. According to information from the CPU 32, the display circuit 26 displays the menu screen and the setting screen on the display section 24. The menu screens include one for assigning each of the tracks 1 through 4 to either a monaural type or a stereo type. In the embodiment, at least any of the tracks 1 through 4 is configured so as to be selectable between a monaural type and a stereo type. The user sets a desired track to either a monaural type or a stereo type. In the multitrack recorder of the embodiment, the track 1 and the track 2 are set to monaural types, and the track 3 and the track 4 can be set to either a monaural type or a stereo type. The setting screen includes one for replicating (cloning or copying) the sound signal recorded in a certain track to another track. The user manipulates the operation knobs 20 on the setting screen, thereby selecting a source track and a destination track.

The CPU 32 commands the display circuit 26 to display a level of the sound signal assigned to each of the tracks in the form of a bar chart (a level meter), and the display circuit 26 displays a level meter image on the display section 24 in accordance with information from the CPU 32.

Moreover, the CPU 32 reads a sound signal recorded in the recorder 34 in conformance with the operation status detection signal from the detection circuit 22 and feeds the signal to the DSP 14. The DSP 14 outputs a sound signal to the outside by way of the bus and the sound signal output circuit 12. The sound output circuit 12 has various output ports, such as an analogue output port and a digital output port.

Figure 2:
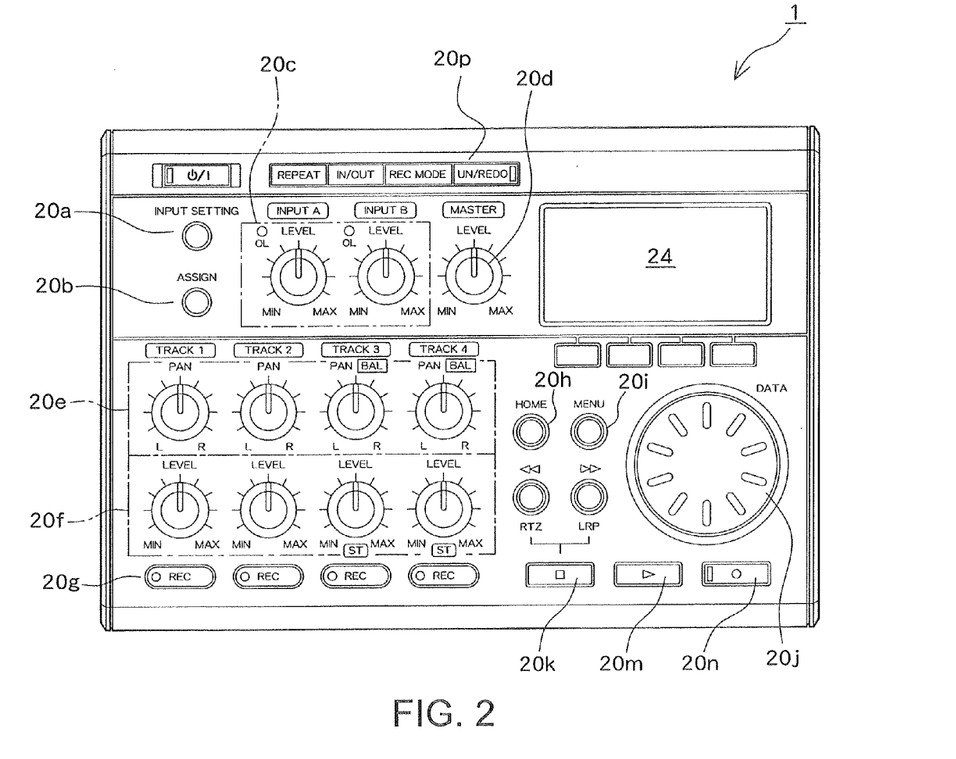
FIG. 2 is a plan view of the multitrack recorder of the embodiment.
Figure 3:
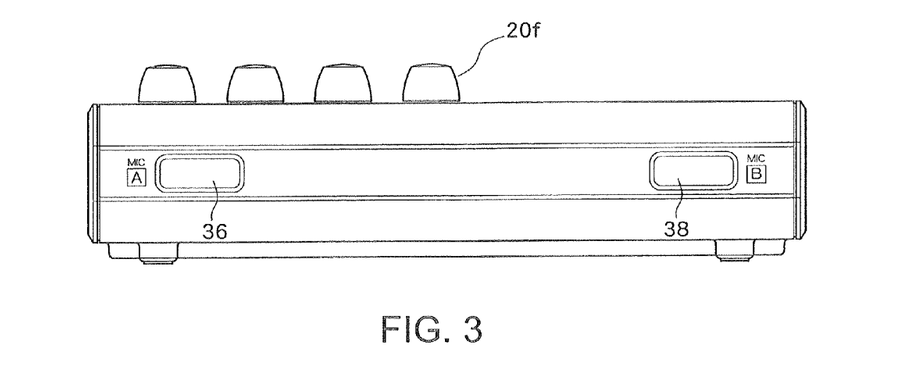
FIG. 3 is a front view of the multitrack recorder of the embodiment.
Figure 4:
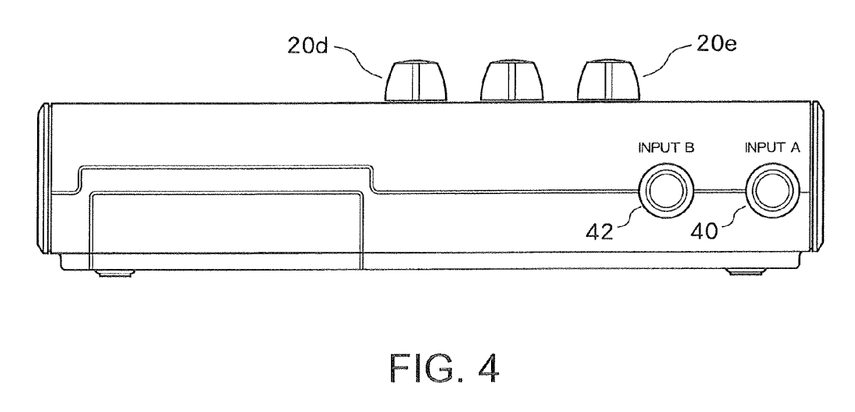
FIG. 4 is a rear view of the multitrack recorder of the embodiment.

FIG. 2 shows a plan view of the multitrack recorder 1 of the embodiment. FIGS. 3 and 4 show a front view and a rearview of the multitrack recorder, respectively.

The operation surface of the multitrack recorder 1 is provided with the variety of operation knobs 20 and the display section 24. The operation knobs 20 include an input setting key 20a, an assign key 20b, an input channel level knob 20c, a master level knob 20d, a PAN knob 20e, a level knob 20f, a recording function key 20g, a home key 20h, a menu key 20i, a data wheel 20j, a stop key 20k, a playback key 20m, a record key 20n, and an UN/REDO key 20p.

The input setting key 20a is one for selecting an input source. The user performs switching whether to use a built-in microphone or an input port as an input source, by manipulating the key.

The assign key 20b is one for assigning an input sound signal to each of the tracks 1 through 4. The user manipulates the key, to thus assign and record a sound signal to each track.

The input channel level knob 20c is one for controlling a level of each of the input sources. The user controls a level of each of the input sources by manipulating the knob. For instance, when the input source is set to a built-in microphone, a level of a sound signal input from the built-in microphone is controlled by use of the knob.

The master level knob 20d is one for controlling a monitor level of a stereo output signal.

The PAN knob 20e is one provided for each of the track 1 to the track 4 and controlling a normal position (PAN) for stereo mix of the sound signal of each of the tracks.

The level knob 20f is provided for each of the track 1 to the track 4 and controlling a level of a sound signal of each of the tracks.

The recording function key 20g is provided for each of the track 1 to the track 4. A track of interest shifts to a record standby state by user's manipulation of the recording function key 20g. When the playback key 20m and the record key 20n are manipulated in the record standby state, a sound signal is recorded in the track that is in the record standby state.

The home key 20h is one for displaying a home screen on the display section 24. The home screen is a basic screen of the multitrack recorder 1 and appears immediately after power of the multitrack recorder 1 is turned on. When the home key 20h is manipulated in the middle of appearance of another screen, the home screen is displayed on the display section 24. The home screen displays a recorder motor and its power status, a transport status of the recorder, a time counter of the recorder, a status and a level meter of each of the tracks 1 to 4, stereo output level meters, and others.

The menu key 20i is one for displaying a menu screen on the display section 24. The menu screen includes information, track edition, a data backup, a tuner, and others. The track edition includes a clone track, cleanout, silence, a cut, open, and others. The clone track is a menu for replicating a track, and cleanout is a menu for deleting a track. Silence is a menu for partially deleting a track. Cut is a menu for partially deleting a track. Open is a menu for inserting silence.

The data wheel 20*j* is one for changing a value of each of the parameters or selecting an item by means of menu manipulation.

The UN/REDO key 20*p* is a key for canceling operation performed immediately before (UNDO) and canceling UNDO operation (REDO). A history screen showing an operation history appears on the display section 24 by pressing the UN/REDO key 20*p* with the stop key 20*k* pressed. Multi-UNDO operation for canceling operations subsequent to desired operation is performed by selecting the desired operation from the history screen.

In the meantime, as shown in the front view of FIG. 3, built-in microphones 36 and 38 are disposed on both sides of the front of the multitrack recorder 1. The built-in microphones 36 and 38 are usually used as right and left microphones; namely, the built-in microphone 36 for an L channel and the built-in microphone 38 for an R channel, during stereo recording operation. However, use of the built-in microphones 36 and 38 is not limited to the way mentioned above. Only either the built-in microphone 36 or the built-in microphone 38 can be used. Alternatively, the built-in microphone 36 can be used for an R channel, and the built-in microphone 38 can be used for an L channel. Levels of the sound signals input from the built-in microphones 36 and 38 are controlled by means of the input channel level knob 20*c*.

Moreover, as shown in a rear view of FIG. 4, input ports 40 and 42 are provided on a rear surface of the multitrack recorder 1. Levels of sound signals input by way of the input ports 40 and 42 are likewise controlled with the input channel level knob 20*c*.

The user can select a desired channel and a desired track by use of the operation knobs 20 and assign a sound signal to a desired track. For instance, the input port 40 is selected as a channel A, and a guitar sound signal is input. The input port 42 is selected as a channel B, and a drum sound signal is input. Assignment is set as follows by use of the assign key 20*b*.

Channel A (a guitar sound signal)—Track 1
Channel B (a drum)—Track 2

Assignment information is stored in the RAM 30. The user sets the track 3 and the track 4 by switching them to a monaural type or a stereo type, by use of the operation knobs 20. For instance, the following are set:

Track 3—stereo
Track 4—monaural

Specifically, each of the track 3 and the track 4 is made up of two channels. When the track is set to a monaural type, only one of the two channels is enabled. In contrast, when the track is set to a stereo type, both of the two channels are enabled and set as an L channel and an R channel. Accordingly, when the track 3 is set to a stereo type, an L channel sound signal and an R channel sound signal are recorded in the track 3.

Setting a type of the track 3 and a type of the track 4 in the embodiment will now be specifically described.

Figure 5:
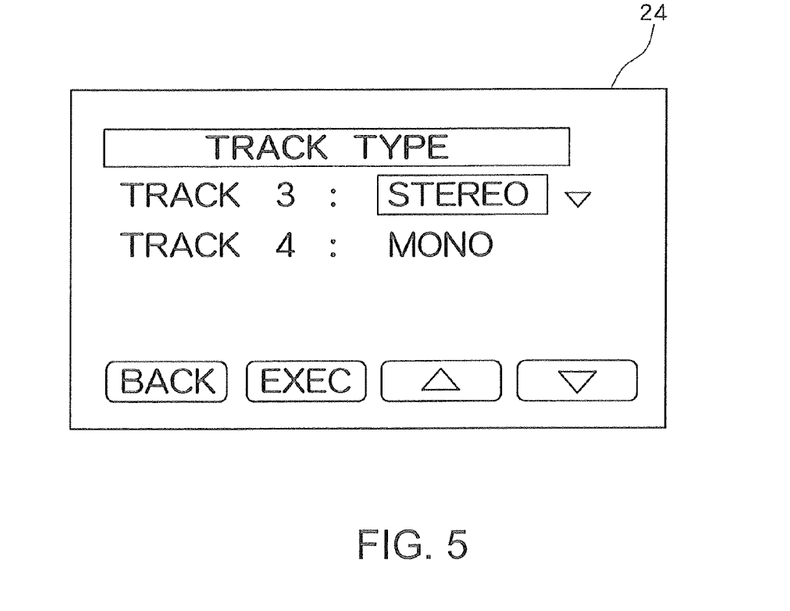
FIG. 5 is a descriptive view showing a setting screen of a track type.

FIG. 5 shows an exemplification of a screen that appears on the display section 24 when the user selects a track type by manipulating the menu key 20*i* and the data wheel 20*j*. In response to manipulation of the menu key 20*i* and the data wheel 20*j*, the CPU 32 displays on the display section 24 a setting screen as to whether to set the track 3 and the track 4 to a monaural type or a stereo type. Alternatives, or monaural and stereo, for the respective tracks 3 and 4 are displayed on the screen. The user manipulates the data wheel 20*j*, to thus make a choice. FIG. 5 shows a case where the user sets the track 3 to a stereo type and the track 4 to a monaural type.

In the embodiment, when the type of the track 3 and the type of the track 4 are changed, audio data stored on the respective tracks are erased. For instance, when the type of the track 3 is changed from the monaural type to the stereo type and the change is set, audio data stored in the track 3 are erased. The reason for this is to maintain consistency between a type of the recorded audio data and the track type.

Specifically, when a change is made to the type of the track, processing pertaining to recording, playback, and copy of the track and various information display modes of the track are naturally changed. For instance, in the case of a stereo-type track, an L audio signal and an R audio signal can be recorded as mutually-independent audio signals on the track. However, if the track is changed to a monaural type, only the L-channel signal or the R-channel signal can be recorded as an audio signal.

If the audio data recorded on the stereo-type track are copied to a monaural-type track, either the L audio signal or the R audio signal will be lost. For this reason, the multitrack recorder of the embodiment is allowed to select only a track that is of the same type as that of a source track as a target track at the time of copying of a track (audio data of one stereo track, however, can be copied to two monaural tracks that are previously paired up with each other). Suppose, for instance, that track 3 is of a stereo type and track 4 is of a monaural type, then the multitrack recorder is set so as to be able to select only either track 1 or 2 as a target track when track 4 is selected as a source track. In contrast, when track 3 is selected as a source track, the multitrack recorder can select only a pair consisting of tracks 1 and 2 as a target track and is inhibited from selecting track 1, track 2, or track 4 alone.

As above, if audio data are left as they are despite a change in track type when changes are made to various processing operations according to the type of the track, consistency between the various processing operations and audio data cannot be maintained. Suppose, for instance, that stereo audio data Sst are not erased when track 3 is set to a monaural type after the stereo audio data Sst have been stored on track 3 set to a stereo type. The stereo audio data Sst remains on the monaural track 3 in this case. When playback of track 3 is performed in this state, the data are played back as monaural audio data even when the audio data Sst stored on track 3 are of a stereo type, and the audio data are played back with an L audio signal or an R audio signal being lost. When an attempt is made to copy the audio data Sst of track 3 to another track, a target track for track 3 is limited to a track of a monaural type that is the same as the current type of track 3. However, since the audio data Sst actually stored on track 3 are of a stereo type, a problem of loss of either the L or R audio signal will arise when such audio data are copied to one monaural track. In order to prevent occurrence of such a problem and confusion to the user, audio data in a corresponding track are also erased when a track type is switched.

The UNDO function of the embodiment will now be described. The multitrack recorder of the embodiment has the UNDO function (an operation cancel function) for recovering a status achieved before operation specified among a round of operations. The UNDO function is broadly divided into single UNDO processing for canceling an immediately-preceding operation and multi-UNDO processing for selecting a time of operation desired to be recovered from an operation history.

Single UNDO processing can be performed by pressing the UN/REDO key 20*p* in the middle of an operation. As a result of performance of single UNDO processing, the immediately-preceding operation is canceled, to thus recover a status achieved before performance of the operation.

Figure 6:
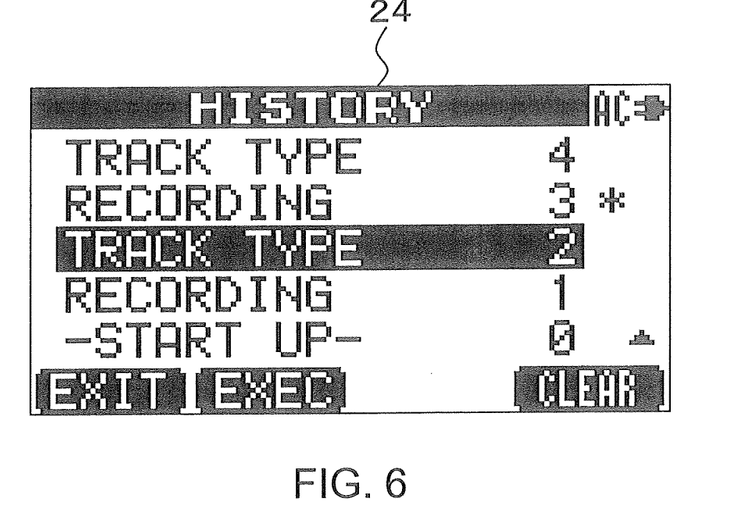
FIG. 6 is a descriptive view showing a history display screen.

Multi-UNDO processing can be performed, so long as the UN/REDO key 20p is pressed while the stop key is pressed to thereby call up the history screen. FIG. 6 is a view showing an example history screen displayed on the display section 24. The history screen shows an operation history. In the example of the display, operations located at higher positions are more recent operations, and the operation located at the top is the most recent operation. In the meantime, the symbol "RECORDING" in FIG. 6 denotes operation for recording data onto a track, and the symbol "TRACK TYPE" in FIG. 6 denotes a track-type changing-and-setting operation. When the user selects one desired operation on the history screen, the CPU 32 cancels operations subsequent to the selected operation, thereby recovering the status achieved before performance of the selected operation.

Even in either single UNDO processing or multi-UNDO processing, an operation that can be canceled includes an operation entailing erasure or changing of audio data to be stored and a track-type changing-and-setting operation. Specifically, an operation entailing erasure or changing of audio data includes, for instance, recording audio data onto each track, mixdown recording for mixing audio data of a plurality of tracks and storing resultant data as single stereo track data, capturing WAVE data from an external device, like a personal computer, track editing (inserting periods of silence, partial cutting, partial elimination, track duplication, and track clearance) to which audio data stored on a track are to be subjected, and a track-type changing-and-setting operation. These operations can be subjected to UNDO processing.

In order to enable UNDO processing, the CPU 32 stores a history of track-type changing-and-setting operations and operations entailing erasure or changing of audio data to be stored on each track as a history list in the RAM 30. Every time an operation, such as track recording, mixdown recording, capturing WAVE data, track editing, and changing of a track type, is performed, the CPU 32 additionally writes the operation into the history list stored in the RAM 30. The CPU 32 also stores audio data to be erased or changed along with performance of various operations, specifics of track-type changing-and-setting operations, and information relevant to operations in association with an operation. Further, when the operation is canceled by UNDO processing, the CPU 32 erases the thus-canceled operation from the history list.

Data/information relevant to each operation, which will be stored in the RAM 30 in preparation for UNDO processing, is as follows. When track recording is performed, the CPU 32 stores in the RAM 30 a number of a track to be subjected to recording, audio data already recorded on the track before recording an operation (audio data which will be erased by overwrite recording), and time to record the audio data in association with the track recording operation. When mixdown recording is performed, the CPU 32 stores in the RAM 30 a history of mixed data on the stereo track in association with the mixdown recording operation. Moreover, when capturing WAVE data is performed, the CPU 32 stores in the RAM 30 a number of a track on which the WAVE data have been captured and the resultantly-captured data. When a track is subjected to editing, the CPU 32 stores in the RAM 30 a number of the track subjected to editing, a type of editing performed, and raw data.

Figure 7:
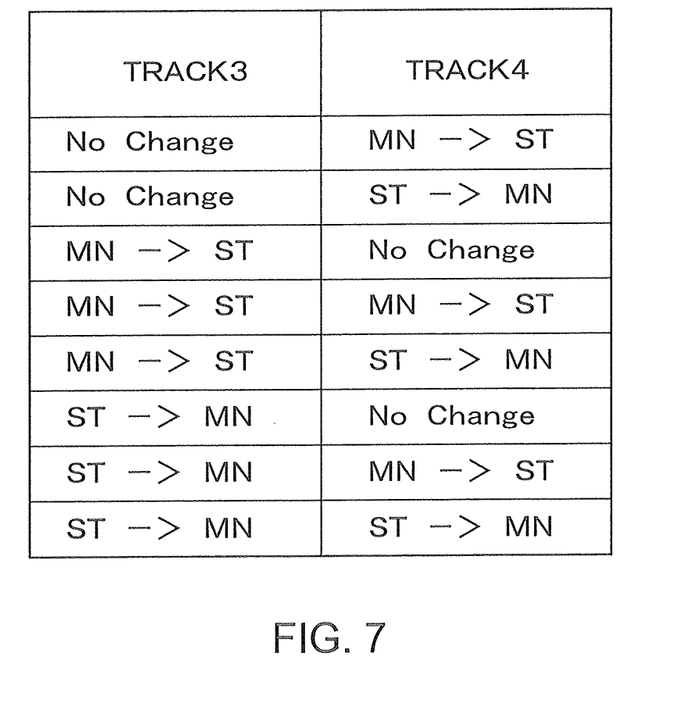
FIG. 7 is a table showing combination patterns of track-type changing-and-setting operations.

When a track-type changing-and-setting operation is performed, the CPU 32 stores in the RAM 30 a pattern of track type change and audio data to be erased along with the changing of a track type. Specifically, in the embodiment, the tracks 3 and 4 are switchable (between a monaural type and a stereo type) in terms of a track type. FIG. 7 shows eight conceivable types of changing patterns for the two tracks. In FIG. 7, symbol MN denotes a monaural type, and ST denotes a stereo type. When a change is made to track type, the CPU 32 stores which one of the changing patterns shown in FIG. 7 is implemented.

Information whose form is other than the foregoing changing patterns can also be stored, so long as a track type achieved when operation is performed can be grasped. For instance, in the form shown in FIG. 7, both a track type achieved before a track-type changing-and-setting operation and a track type achieved after the track-type changing-and-setting operation are stored. However, it is also possible to store only a track type achieved after a track-type changing-and-setting operation. Alternatively, it is also possible to store only information about whether or not a change is made to a track type ("No Change" or "Changed") in place of the track type itself (i.e., a stereo type or a monaural type). In this case, a track type acquired at the time of a track-type changing-and-setting operation can be grasped by counting the number of times "Changed" has been made since start-up of the multitrack recorder, so long as a setting on a track type acquired at start-up of the multitrack recorder is stored.

As mentioned above, in the embodiment, when a change is made to the track type, the audio data stored in the thus-changed track are erased. In association with the track-type changing-and-setting operation, the CPU 32 stores the audio data which will be erased along with changing of the track type in the RAM 30.

When a command for canceling the track-type changing-and-setting operation is issued by means of UNDO processing, the CPU 32 restores audio data and changes the track type on the basis of the thus-stored pieces of information. During UNDO processing of the setting on a track type change, recovering the status achieved before setting of a track type change is performed, as well as restoring the erased audio data. The reason for this is to maintain consistency between the audio data to be stored and a type of each track.

Suppose, for instance, that a track-type changing-and-setting operation is performed to thereby change the track 3, where monaural audio data Smn are recorded, from a monaural type to a stereo type. The monaural audio data Smn stored in the track 3 are erased along with performance of the track-type setting-and-changing operation. When the track-type changing-and-setting operation is canceled by means of UNDO processing, the once-erased audio data Smn are restored, and a recovery is made to the status in which the monaural audio data Smn are recorded on the track 3. If the type of the track 3 is left as a stereo type without being recovered to the monaural type, the monaural audio data Smn will come to be recorded on the stereo-type track 3. In this case, since no match exists between the track type and the type of the recorded audio data Smn, a failure arises in recording, playback, and copying operations. For this reason, in the embodiment, the track-type changing-and-setting operation is stored as one operation history. When a cancel command is issued by means of UNDO processing, the track type achieved before the change was made is recovered, in addition to restoration of the erased audio data.

Figure 8:
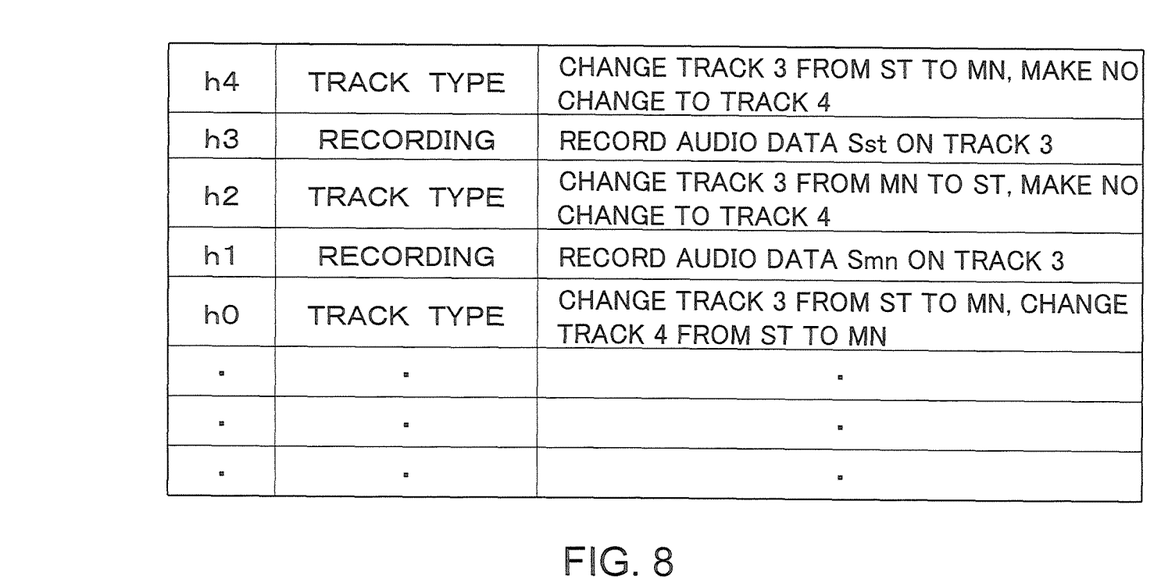
FIG. 8 is a table showing an example of operation history.

Explanations will now be provided by use of a specific example of a flow of UNDO processing. FIG. 8 is a table showing an example of a particular operation history. In the example, operation h0 to operation h4 are assumed to be performed in this sequence. In connection with the operation h0, a track-type changing-and-setting operation is performed to thereby change track 3 from a stereo type to a monaural type and change track 4 from a stereo type to a monaural type. In connection with the operation h1, (monaural) audio data Smn are recorded on track 3. In connection with the operation h2, a track-type changing-and-setting operation is performed to thereby change track 3 from a monaural type to a stereo type (without changing track 4). In connection with the operation h3, the (stereo) audio data Sst are recorded on track 3. In connection with the operation h4, a track-type changing-and-setting operation is performed to thereby change track 3 from a stereo type to a monaural type (without changing track 4).

When the operation h4 is presumed to be the latest operation, the type of track 3 has already been changed immediately before. Hence, the audio data Sst are erased, and track 3 stays empty. Further, both track 3 and track 4 are of a monaural type.

When the user issues a single UNDO command by pressing the UN/REDO key 20p after performing the operations h0 to h4, the latest operation h4 is canceled, and a recovery is made to the status achieved immediately before the operation h4 (i.e., the status achieved immediately after the operation h3). Moreover, even when the user calls up a history screen by pressing the UN/REDO key 20p while pressing the stop key 20k and selects the operation h4 on the history screen, the operation h4 is canceled, and a recovery is made to the status achieved immediately before the operation h4 (i.e., the status achieved immediately after the operation h3).

In this case, a recovery is made to the status in which the (stereo) audio data Sst erased along with performance of the track-type changing-and-setting operation in relation to the operation h4 are stored on track 3. Since changing of a track type performed in relation to the operation h4 is also erased, a recovery is made to the status achieved before the operation h4, namely the status in which track 3 is of a stereo type and in which track 4 is of a monaural type. Specifically, a status is achieved in which the stereo-type audio data Sst are stored in the stereo-type track 3.

Assume another example in which the user has selected the operation h2 on the history screen. In this case, the operations h2, h3, and h4 are erased, and a recovery is made to the status achieved immediately before the operation h2 (the status achieved immediately after the operation h1). Specifically, a recovery is made to the status in which the (monaural) audio data Smn erased along with performance of the track-type changing-and-setting operation in relation to the operation h2 are stored on the track 3. Further, since changing of the track type performed in relation to the operation h4 and the operation h2 are also erased, a recovery is made to the status before the operation h2, namely the status in which track 3 is of a monaural type and in which track 4 is of a monaural type. Specifically, a recovery is made to the state in which the monaural audio data Smn are stored on the monaural-type track 3.

As is obvious from the above descriptions, the track-type changing-and-setting operation is also stored as one operation history in the embodiment. At the time of UNDO processing, the audio data erased along with performance of the changing-and-setting operation are restored, and the track type changed along with performance of the changing-and-setting operation is also recovered to the track type achieved before the changing-and-setting operation. Therefore, in the embodiment, consistency between the type (stereo/monaural) of the restored audio data and the type (stereo/monaural) of the track where the sound is to be recorded can be maintained at all times. As a consequence, the user can smoothly perform subsequent operations after UNDO processing without resetting the track types, and others, according to the type (stereo/monaural) of the restored audio data. In the embodiment, two tracks (tracks 3 and 4) of the four tracks are made switchable between a monaural type and a stereo type. However, the number of track combinations can also be changed as necessary.

In the embodiment, in addition to the track-type changing-and-setting operation and operation entailing erasure and changing of audio data, another operation, for instance, assignment setting operation, can also be taken as a target of UNDO processing. The assignment setting is for assigning either the channel A or B as an input source to each of the tracks. Although two channels can be assigned to a stereo track, only one channel is assigned to a monaural track. In order to maintain combinations "stereo track—two channels" and "monaural track—one channel," the assignment setting operation can also be stored as a target operation of UNDO processing so that when cancellation is commanded, a recovery can be made to a status achieved before performance of the assignment setting operation.

Although a track type change history is stored as a set of change histories of a plurality of tracks (track 3 and track 4) in the embodiment, a track type change history can also be stored for each track.

In the embodiment, the multitrack recorder having track 1 through track 4 is exemplified. However, the invention is not limited to such a multitrack recorder and can also be applied likewise to a multitrack recorder having five tracks or more or a multitrack recorder having three or less tracks.

What is claimed is:

1. A multitrack recorder that records audio data onto a plurality of tracks, comprising:
   a memory device; and
   a processor coupled to the memory device and configured to:
   set one track or more of the plurality of tracks to either a monaural type or a stereo type;
   store in the memory device a history of track-type changing-and-setting operations and operations entailing erasure or changing of audio data stored on each track;
   store in the memory device specifics of the track-type changing-and-setting operations and the audio data erased or changed along with performance of operations in association with each operation; and
   when one operation is designated from the history of operations, specify audio data stored in each track and a track type of each track achieved immediately before performance of the designated operation and change the audio data stored in each track and a track type of each track currently achieved to the audio data and the track type that are specified.

2. The multitrack recorder according to claim 1, wherein the processor is configured to erase audio data stored in a corresponding track along with performance of the track-type changing-and-setting operation, and the memory device is configured to store specifics of the change in track type and audio data erased by a track-type changing-and-setting operation in association with the track-type changing-and-setting operation.

3. A multitrack recorder comprising:
   a memory;
   one or more tracks, which can be set to a monaural type or a stereo type, each track being configured to store audio of a corresponding type;
   a processor configured to:
   store in memory a list of operations performed on the audio data stored in the tracks and of changes between the monaural type and the stereo type for each track, and versions of the audio data corresponding to each operation;

present to a user on a display the list of operations and changes in type; and when a user selects an operation or change in type from the list, specify audio data and the track type achieved immediately before performance of the operation or change in type which is selected, and change the audio data and the track type of each track currently achieved back to the audio data and the track type that are specified.

4. The multitrack recorder of claim 3 wherein the processor is configured to delete operations and changes in track type that occurred subsequent to the operation or change in track type selected by the user.

5. A method comprising:

recording audio data in one or more tracks of a multitrack recorder, wherein each track can be set to a monaural type or a stereo type;

storing in a memory of the multitrack recorder versions of the audio data corresponding to each instance that a user edits the audio data of the tracks;

storing in the memory a list of edit operations performed by the user on the audio data of the tracks and of changes of the tracks between a monaural type and stereo type; and presenting the list to a user on a display of the multitrack recorder; and when a user selects an operation from the list, specifying audio data and the track type achieved immediately before performance of the operation which is selected, and changing the audio data of the tracks and the type of the tracks currently achieved back to the audio data and the track type that are specified.

6. The method of claim 5 comprising deleting from the list, by the processor, operations that occurred subsequent to the operation selected by the user from the list.

7. The method of claim 6 comprising deleting from the memory versions of the audio data correspond to operations that occurred subsequent to the operation selected by the user.

* * * * *